United States Patent
Ku et al.

(10) Patent No.: US 8,351,212 B2
(45) Date of Patent: Jan. 8, 2013

(54) MAINFRAME STRUCTURE

(75) Inventors: Kang Ku, Jhonghe (TW); Hsien-Tang Liu, Jhonghe (TW); Wen-Cheng Liu, Jhonghe (TW)

(73) Assignee: Datavan International Corp., Jhonghe, Taipei Hsien (TW)

( * ) Notice: Subject to any disclaimer, the term of this patent is extended or adjusted under 35 U.S.C. 154(b) by 218 days.

(21) Appl. No.: 12/981,200

(22) Filed: Dec. 29, 2010

(65) Prior Publication Data
US 2012/0170233 A1    Jul. 5, 2012

(51) Int. Cl.
*H05K 5/00* (2006.01)
*H05K 7/00* (2006.01)
*F28F 7/00* (2006.01)

(52) U.S. Cl. .............. 361/752; 361/679.24; 361/679.27; 361/679.29; 361/704; 361/707; 165/80.2

(58) Field of Classification Search ............. 361/679.02, 361/679.09–679.31, 679.52, 679.54, 679.4, 361/679.41–679.45, 724–771, 704, 707, 361/709, 711, 718, 719; 165/80.2, 80.3, 165/185
See application file for complete search history.

(56) References Cited

U.S. PATENT DOCUMENTS

2003/0174813 A1*   9/2003   Mohammadian et al. ...... 379/22
2010/0309636 A1*  12/2010   Drummy et al. .............. 361/721

* cited by examiner

*Primary Examiner* — Jayprakash N Gandhi
*Assistant Examiner* — Jerry Wu
(74) *Attorney, Agent, or Firm* — Muncy, Geissler, Olds & Lowe, PLLC

(57) ABSTRACT

A mainframe structure includes a housing having a front opening, flanges on one same plane around the front opening and stop members suspending on the inside corresponding to the flanges, a circuit module accommodated in the housing, and a cover detachably mounted in the front opening of the housing and stopped against the flanges and the stop member. The cover has two slots symmetrically disposed at two opposite lateral sides, two lugs respectively disposed adjacent to the slots and two handles respectively mounted in the slots and pivoted to the lugs in reversed directions. By means of biasing the two handles to stop against respective stop members, the user can detach the cover from the housing conveniently with the hands without any hand tools.

11 Claims, 8 Drawing Sheets

MAINFRAME STRUCTURE

BACKGROUND OF THE INVENTION

1. Field of the Invention

The present invention relates to computer mainframe design technology and more particularly, to a mainframe structure, which allows quick removal of a cover from an opening on one side of the accommodation chamber of the housing thereof by means of operating multiple handles that are pivoted to the cover, facilitating maintenance.

2. Description of the Related Art

Following fast development of electronic technology, many advanced electronic products, such as computer, cash register, auto teller machine, ticket vending machine and etc., are created and intensively used in fixed places in our daily living. The application of these advanced electronic devices saves much labor and cost. Using electronic devices to perform money counting and number calculation works, avoiding human error. For the advantages of word processing, communication and data inquiry functions and under the environment of high internet popularity, computer has become a requisite tool in most people's daily life. Nowadays, many companies, shops, persons and homes use electronic apparatus to perform different jobs.

To enhance mobility and to save space occupation, manufacturers are trying to create small-sized electronic products. FIG. 8 illustrates a conventional electronic mainframe design. As illustrated, the mainframe comprises a rectangular housing A that defines an accommodation chamber A0 and an opening A1 that is covered with a detachable cover panel A2, and a circuit board B mounted inside the accommodation chamber A0. The circuit board B carries a microprocessor B1, carrying memory, display module, network module (not shown) and many other electronic components, and a cooler module B2 that is attached to the microprocessor B1.

Because the cover panel A2 is fastened to the housing A over the opening A1 by screws and the circuit board B is affixed to the accommodation chamber A0 inside the housing A, a hand tool is necessary when detaching the cover panel A2 or the circuit board B. Without a suitable hand tool, a person cannot detach the cover panel A2 and the circuit board B. Further, because the cover panel A2 and the circuit board B are disposed at different locations, the detaching procedure is complicated, requiring much labor and time. Further, it is necessary to remove the cooler module B2 prior to detaching the circuit board B, complicating the procedure.

Therefore, it is desirable to provide a mainframe structure that eliminates the aforesaid problems.

SUMMARY OF THE INVENTION

The present invention has been accomplished under the circumstances in view. It is one object of the present invention to provide a mainframe structure, which comprises a housing, a circuit module accommodated in the housing, and a cover detachably mounted in a front opening of the housing, wherein the cover comprises two slots symmetrically disposed at two opposite lateral sides, two lugs respectively disposed adjacent to the slots and two handles respectively mounted in the slots and pivoted to the lugs in reversed directions. By means of biasing the two handles to stop against respective stop members, the user can detach the cover from the housing conveniently with the hands without any hand tools.

It is another object of the present invention to provide a mainframe structure, wherein the cover has a plurality of posts located on the back side thereof; the circuit module comprises a main circuit board that is vertically mounted in the housing and affixed to the posts of the cover such that detaching the cover from the housing causes the main circuit board to be detached from the housing with the cover.

It is still another object of the present invention to provide a mainframe structure, wherein the circuit module consists of a main circuit board, a functional circuit board and a display circuit board; the main circuit board has its backwardly extending at least one first electrical connector and at least one second electrical connector respectively electrically connected to at least one first connection port of the functional circuit board and at least one second connection port of the display circuit board. Thus, when the user operates the handles to detach the cover, the applied force is evenly transferred to the stop members to force the main circuit board and the cover forwardly away from the housing without tilting, avoiding sticking and simplifying the detaching procedure.

It is still another object of the present invention to provide a mainframe structure, wherein the cover is a metal cover member comprising a plurality of radiation fins located on the front side thereof and a plurality of contact portions located on the back side thereof and respectively kept in contact with respective chips at the front side of the main circuit board for quick transfer of waste heat from the chips to the radiation fins for dissipation into the outside open air. Thus, no extra heat sink or cooler means is necessary for dissipating waste heat from the chips of the main circuit board, simplifying the installation procedure of the mainframe structure and saving much heat sink installation space.

It is still another object of the present invention to provide a mainframe structure, which is so arranged that when the user is going to detach the cover after the mainframe structure having been operating for a certain period of time, the user can loosen the cover mounting thumbscrews with one hand and then bias the handles with the two hands against the stop members to force the cover and the main circuit board forwardly away from the housing without any tools or direct hand contact with the hot cover, preventing scald injury.

DETAILED DESCRIPTION OF THE PREFERRED EMBODIMENT

Figure 1:
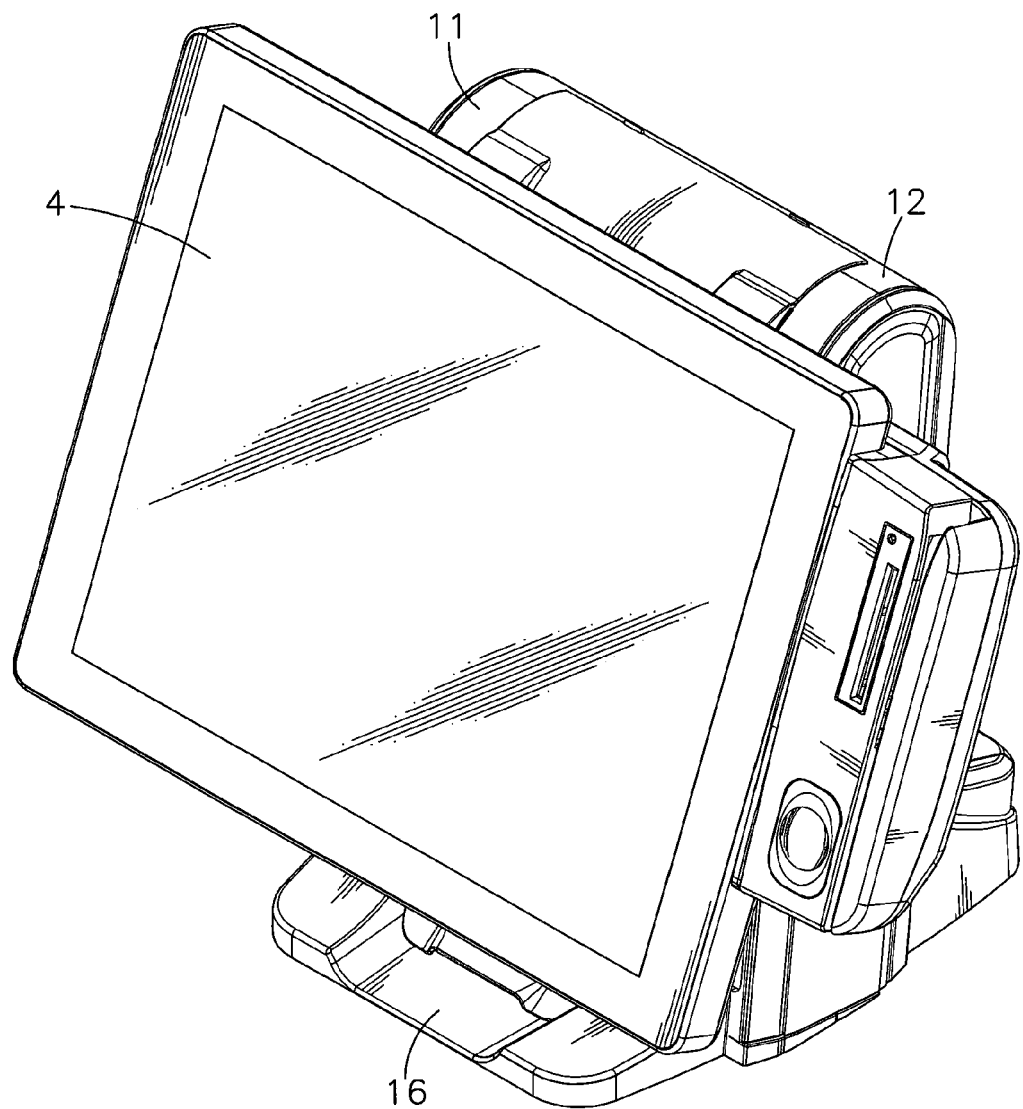
FIG. 1 is an oblique elevation of a mainframe structure in accordance with the present invention.

Referring to FIGS. 1~4, a mainframe structure in accordance with the present invention is shown comprising a housing 1, a circuit module 2 and a cover 3.

The housing 1 defines therein an accommodation chamber 10. According to this embodiment, the housing 1 consists of a front cover shell 11 and a back cover shell 12. The accommodation chamber 10 is defined in between the front cover shell 11 and the back cover shell 12. Further, the housing 1 comprises a front opening 13 located on the front wall (front cover shell 11) thereof, a plurality of flanges 131 and mounting holes 132 respectively disposed around the front opening 13 on the same plane, a plurality of stop members 14 suspending on the inside and respectively aimed at the flanges 131 at the same elevation, a plurality of through holes 15 cut through, for example, the back wall (back cover shell 12) thereof, and a forwardly and backwardly expanded base 16 located on the bottom side thereof (formed of a part of the front cover shell 11 and a part of the back cover shell 12). The base 16 has a certain thickness for positioning on a flat surface steadily.

The circuit module 2 is accommodated in the accommodation chamber 10 inside the housing 1, comprising a main circuit board 21, a functional circuit board 22 and a display circuit board 23. The main circuit board 21 is vertically set in the accommodation chamber 10 at the front side, comprising at least one, for example, two first electrical connectors 211 and at least one, for example, one second electrical connector 212 respectively located on the back side near the bottom and top edges thereof, and at least one, for example, a plurality of chips 213 located on the front side thereof. The functional circuit board 22 is horizontally set in the accommodation chamber 10 below the main circuit board 21 in a perpendicular manner relative to the main circuit board 21, comprising at least one, for example, two first connection ports 221 located on the top wall thereof in a forwardly extending manner and respectively electrically connected to the first electrical connectors 211 of the main circuit board 21, and a plurality of electrical connectors 222 located on the top wall near the rear side thereof and respectively attached to the through holes 15 of the housing 1. The display circuit board 23 is vertically set in the accommodation chamber 10 at the top side of the main circuit board 21, comprising at least one, for example, one second connection port 231 located on the front wall near the bottom side thereof and electrically connected to the second electrical connector 212 of the main circuit board 21, and at least one, for example, two video connectors 232 located on the top side thereof.

The cover 3 is mounted in the front opening 13 of the housing 1 and stopped against the flanges 131 and the stop members 14, comprising a plurality of mounting holes 31 respectively fastened to the mounting holes 132 of the housing 1 by respective thumbscrews 311, two slots 32 symmetrically disposed two opposite lateral sides thereof, two lugs 321 respectively backwardly extended from the two opposite lateral sides adjacent to the slots 32 and two handles 33 respectively mounted in the slots 32 and respectively pivotally connected to the lugs 321 in reversed directions. Further, the stop members 14 are respectively stopped against the back wall (inner wall) of the cover 3 adjacent to the slots 32. Each handle 33 comprises a base portion 331 inserted into one slot 32, a connection portion 332 backwardly extended from the base portion 331 and pivotally connected to the associating lug 321, a grip portion 333 extended from one end of the base portion 331 and an actuation portion 334 extended from an opposite end of the base portion 331 for stopping against the front edge of one stop member 14. The cover 3 further comprises a plurality of radiation fins 34 located on the front side thereof, a plurality of posts 35 backwardly extended from the back side thereof for the mounting of the main circuit board 21 of the circuit module 2, a plurality of contact portions 36 located on the back side thereof and respectively kept in contact with the chips 213 of the main circuit board 21 for quick transfer of waste heat from the chips 213 to the radiation fins 34 for dissipation into the outside open air. The cover 3 is made of a heat-conducting material, such as aluminum or copper.

Further, according to the present preferred embodiment, the housing 1 consists of a front cover shell 11 and a back cover shell 12. However, this arrangement is not a limitation. Many other modifications may be employed without departing from the spirit and scope of the invention. As an alternate form of the present invention, the housing 1 can be formed of more than two cover shells with an accommodation chamber defined therein for accommodating the main circuit board 21, functional circuit board 22 and display circuit board 23 of the circuit module 2.

Referring to FIGS. 2 and 3 again, as illustrated, the main circuit board 21 of the circuit module 2 simply provides memory card connectors for the installation of memory devices. Expansion interface devices (such as USB connector, network connector, SATA connector and etc.), switches and indicator lights are installed in the functional circuit board 22. The display circuit board 23 of the circuit module 2 is adapted for the installation of display chip, radiation fins and expansion interface devices. Thus, only detachable components are installed in the main circuit board 21 of the circuit module 2, enabling the size of the main circuit board 21 to be minimized. Further, the main circuit board 21 utilizes at least one first electrical connector 211 and at least one second electrical connector 212 for the connection of the at least one first connection port 221 of the functional circuit board 22 and the at least one second connection port 231 of the display circuit board 23 respectively. Thus, the user can detach the main circuit board 21 from the functional circuit board 22 and the display circuit board 23 easily by hand without any hand tools, facilitating maintenance of the mainframe structure.

Referring to FIGS. 5~7 and FIGS. 2~4 again, as illustrated, the main circuit board 21 of the circuit module 2 is fastened to the posts 35 of the cover 3; the contact portions 36 of the cover 3 are respectively kept in contact with the chips 213 of the main circuit board 21 for quick transfer of waste heat from the chips 213 to the radiation fins 34 for dissipation into the outside open air during operation of the chips 213. Thus, it is not necessary to install a heavy heat sink or cooler means in the main circuit board 21 for quick dissipation of waste heat. Therefore, the invention has the advantage of small size and can effectively lower the temperature during operation.

Further, the main circuit board 21 of the circuit module 2 uses its backwardly extending at least one first electrical connector 211 and at least one second electrical connector 212 for the connection of the at least one first connection port 221 of the functional circuit board 22 and the at least one second connection port 231 of the display circuit board 23 respectively to let the functional circuit board 22 and the display circuit board 23 be electrically connected thereto and firmly secured in position. When dismounting the main circuit board 21, the main circuit board 21 is moved with the cover 3 forwardly away from the housing 1. At this time, the user can hold the handles 33 with the two hands and then pull the cover 3 and the main circuit board 21 apart from the functional circuit board 22 and the display circuit board 23 in a balanced manner. During installation, the user can hold the handles 33 with the two hands and then force the cover 3 and the main circuit board 21 into the front opening 13 of the housing 1 to connect the at least one first electrical connector 211 and the at least one second electrical connector 212 to the at least one first connection port 221 of the functional circuit board 22 and the at least one second connection port 231 of the display circuit board 23 respectively. Thus, the invention facilitates mounting and dismounting.

Further, if the cover 3 becomes hot due to continuous transfer of waste heat from the chips 213 of the main circuit board 21 through the contact portions 36 after startup of the mainframe, directly touching the cover 3 with the hands to dismount the cover 3 will make the hands uncomfortable and may cause a scald injury. In this case, the user can loosen each of the thumbscrews 311 with one hand and then remove the thumbscrews 311 from the mounting holes 31 of the cover 3 and the mounting holes 132 of the housing 1, and then pull the grip portions 333 of the handles 33 outwards with the two hands to bias the respective connection portions 332 relative to the associating lugs 321 and to simultaneously force the respective actuation portions 334 against the respective stop members 14, causing the cover 3 and the main circuit board 21 to be moved forwards relative to the front cover shell 11 and rear cover shell 12 of the housing 1 without tilting. During forward displacement of the main circuit board 21 with the cover 3, the at least one first electrical connector 211 and at least one second electrical connector 212 of the main circuit board 21 are respectively disconnected from the at least one first connection port 221 of the functional circuit board 22 and the at least one second connection port 231 of the display circuit board 23 directly without further complicated detaching steps, allowing removal of the cover 3 and the main circuit board 21 from the housing 1 with the hands directly. Because the user needs not to use any hand tools or to touch the cover 3 directly with the hands when detaching the cover 3 and the main circuit board 21 from the housing 1, the invent allows quick and easy dismount of the cover 3 and the main circuit board 21 from the housing 1, preventing scald injury.

Figure 2:
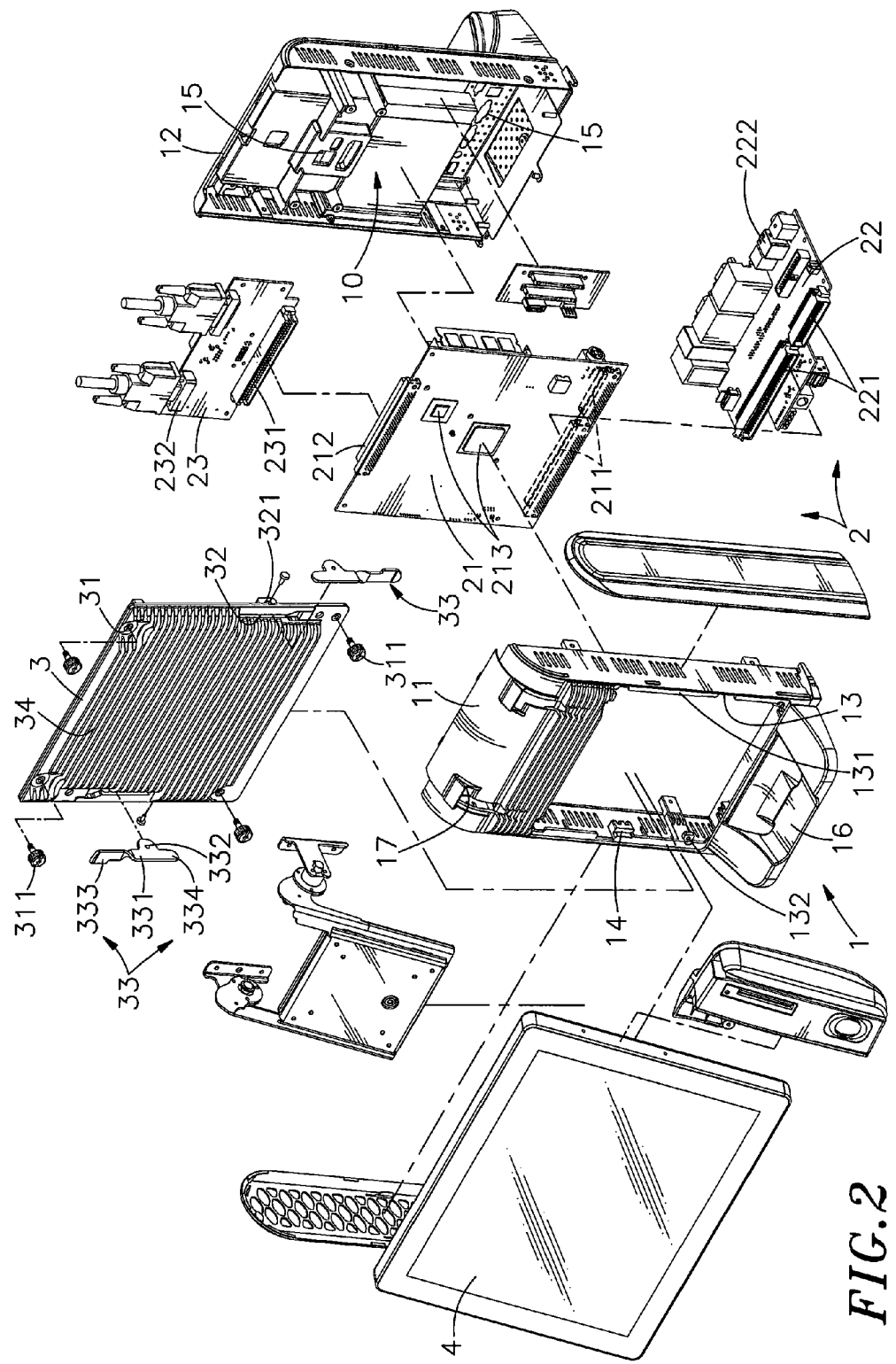
FIG. 2 is an exploded view of the mainframe structure in accordance with the present invention.
Figure 3:
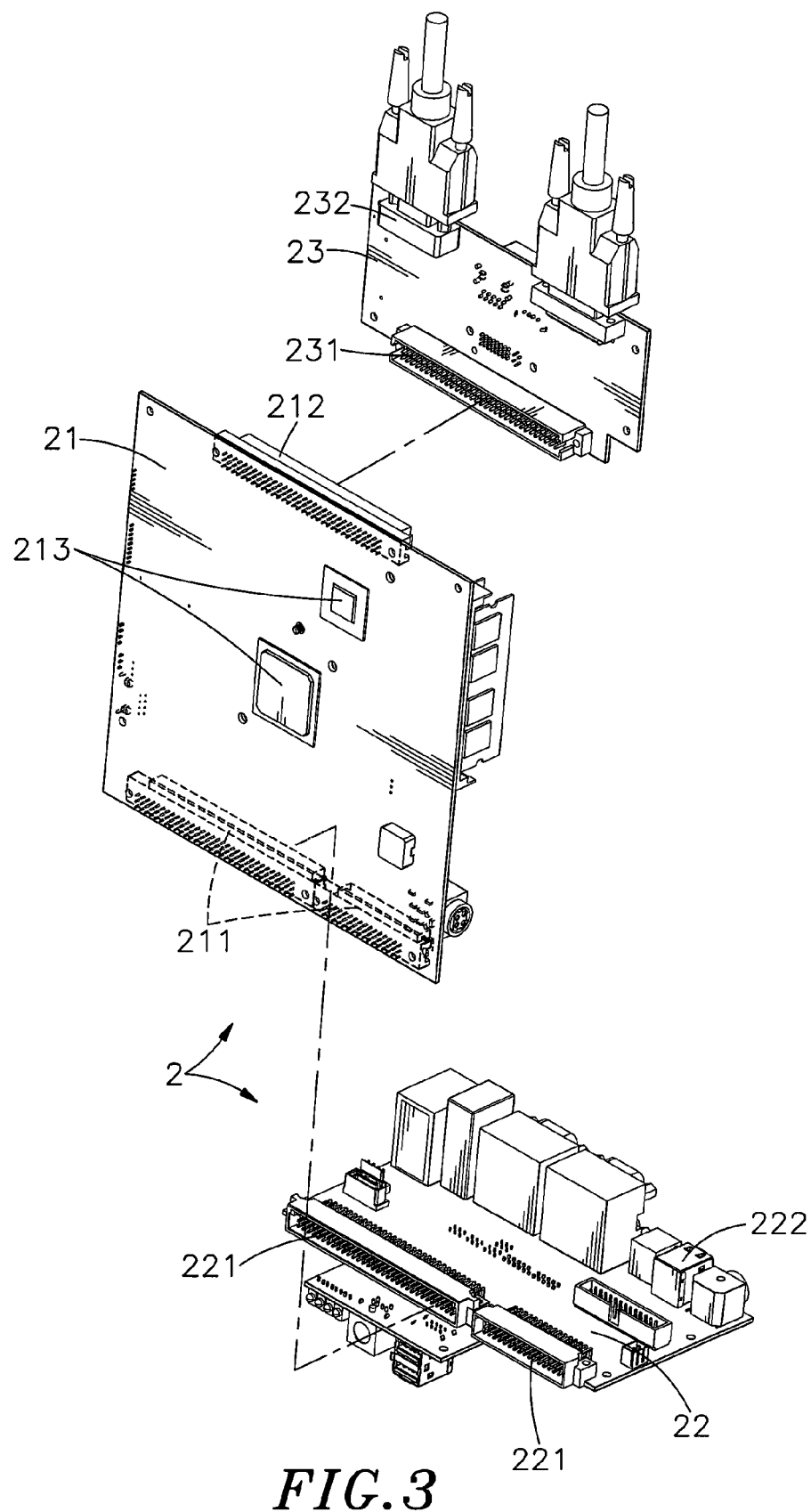
FIG. 3 is an exploded view of the circuit module of the mainframe structure in accordance with the present invention.
Figure 4:
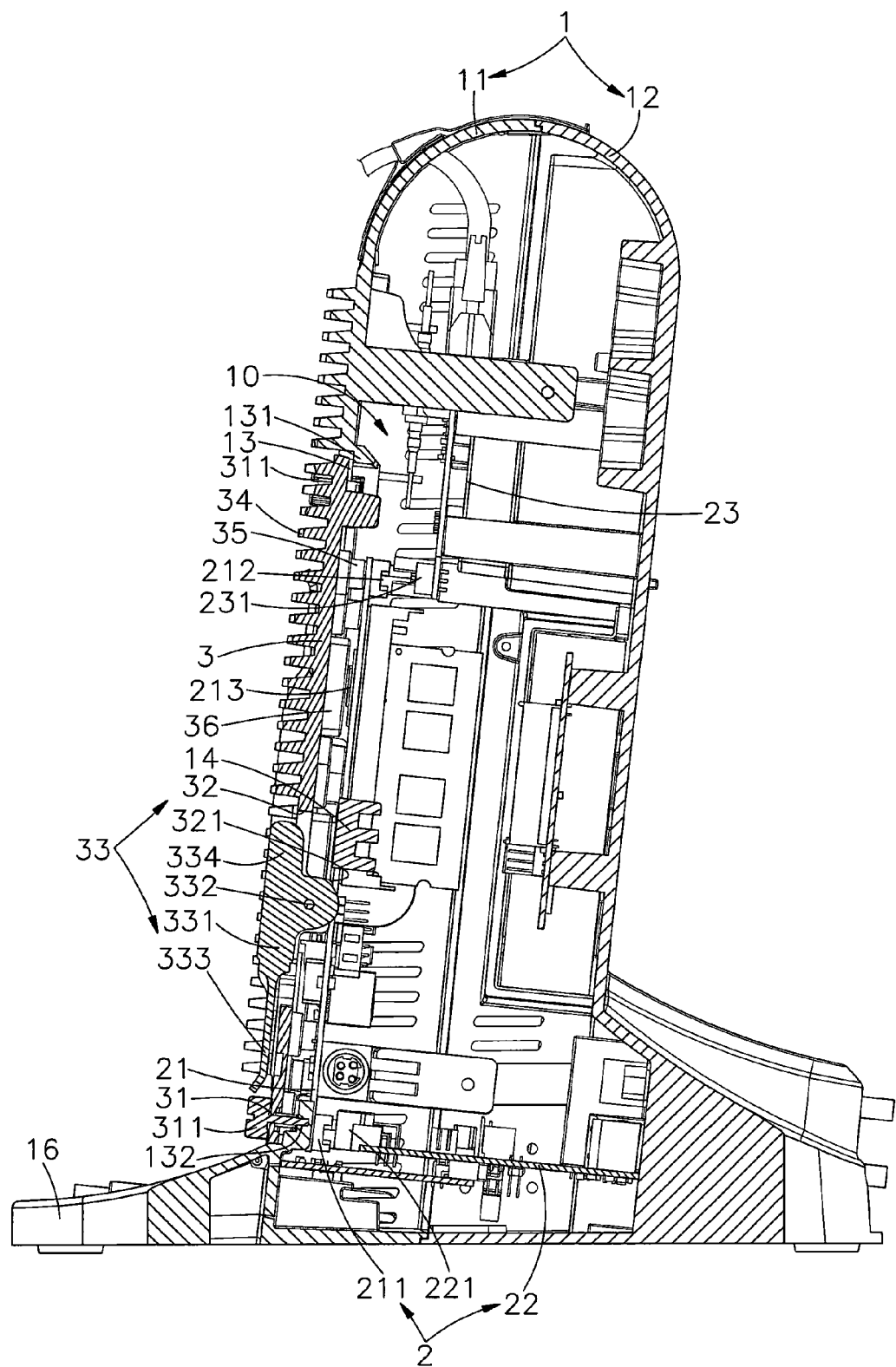
FIG. 4 is a sectional side view of the mainframe structure in accordance with the present invention.
Figure 5:
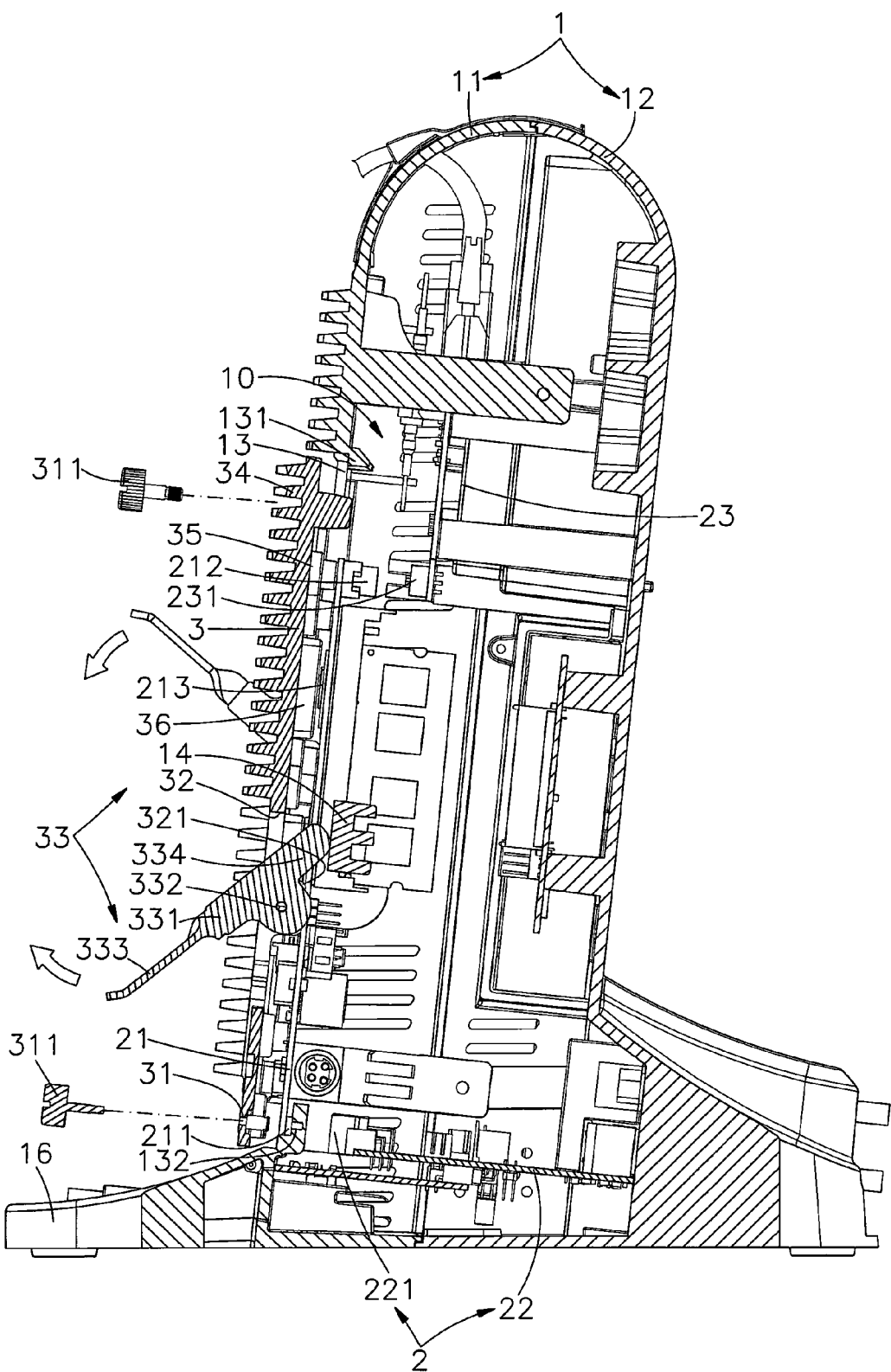
FIG. 5 is a schematic sectional side view of the present invention, illustrating a cover detachment operation.
Figure 6:
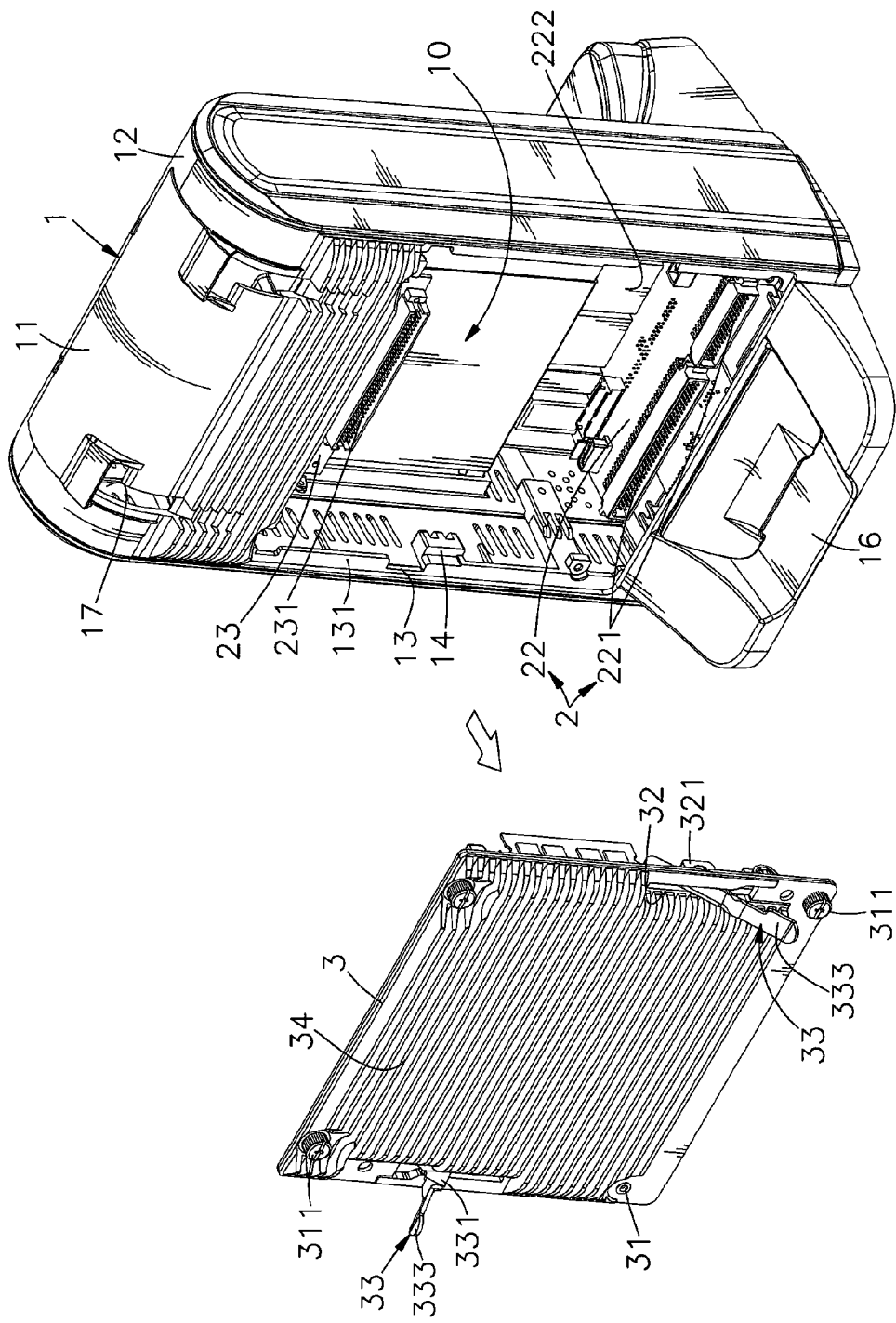
FIG. 6 corresponds to FIG. 5, illustrating the cover with the attached main circuit board detached from the housing.
Figure 7:
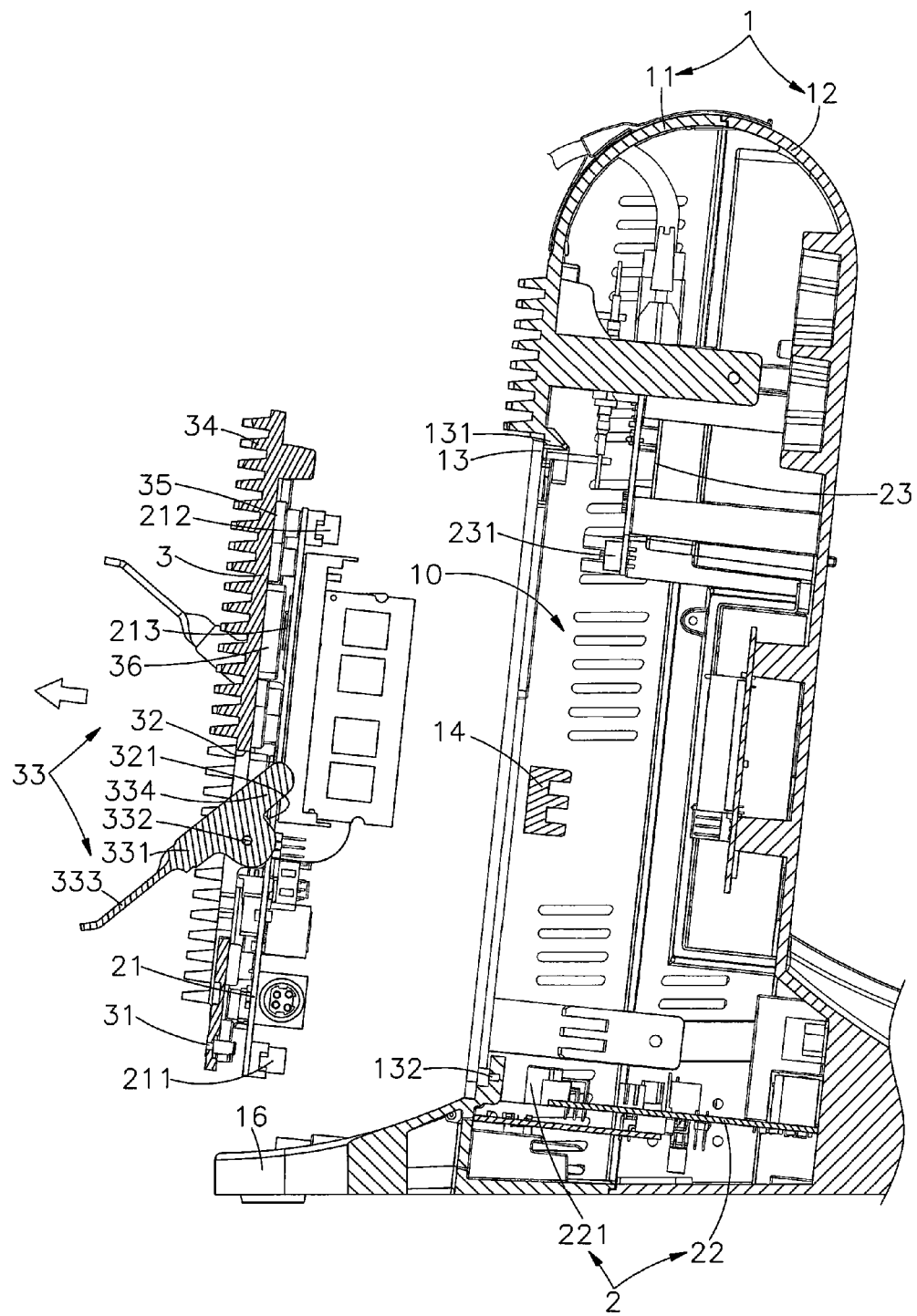
FIG. 7 is a sectional side view, in an enlarged scale, of FIG. 6.
Figure 8:
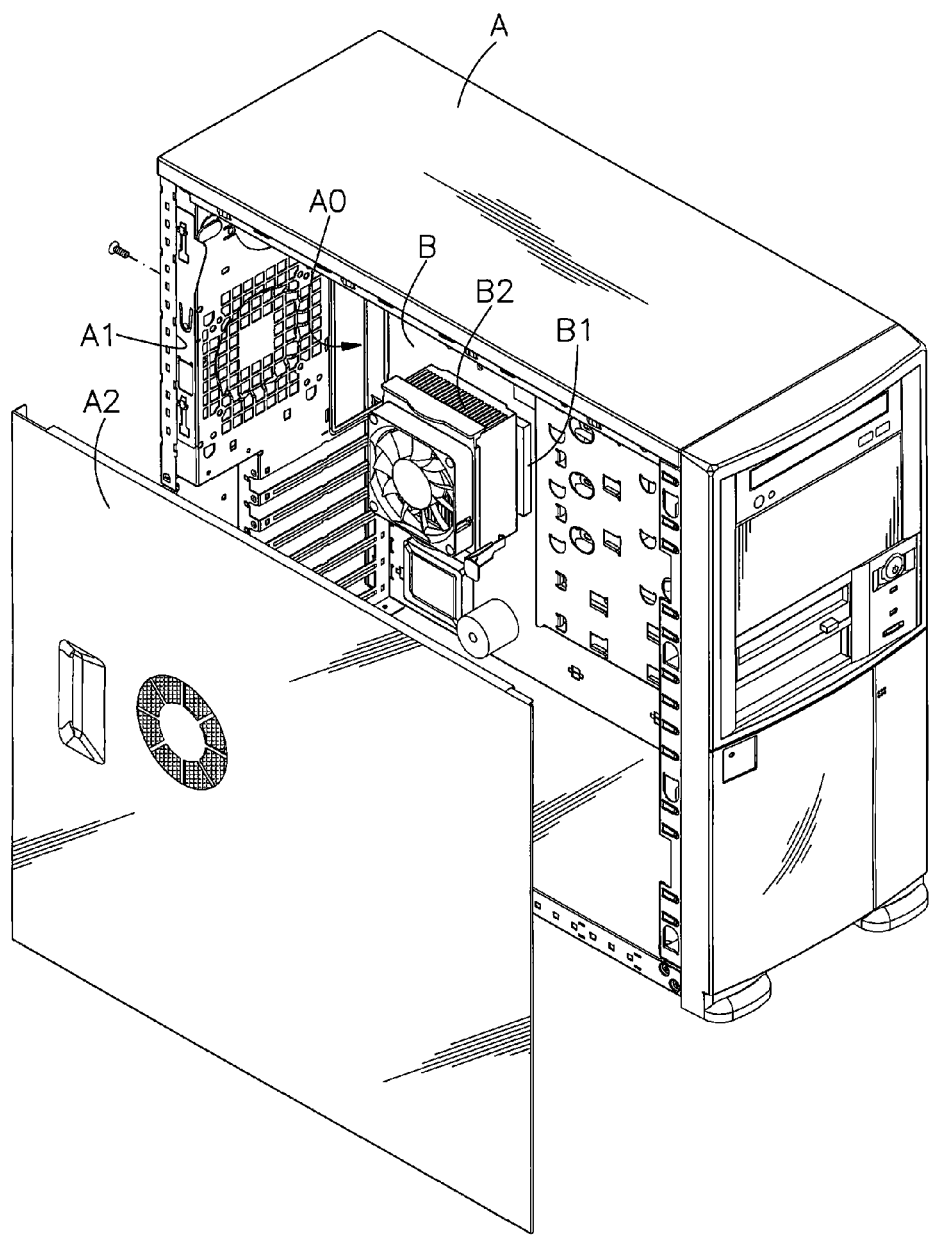
FIG. 8 illustrates a computer mainframe according to the prior art.

Referring to FIGS. 2~4 again, a display screen 4 is installed in the top side of the housing 1 and electrically connected to one video connector 232 of the display circuit board 23 that is vertically mounted in the accommodation chamber 10 at the top side of the main circuit board 21. Further, the housing 1 has a wire hole 17 located on the top side thereof for the passing of the cable (not shown) of the display screen 4 to connect to one video connector 232 of the display circuit board 23. Because the display screen 4 is directly mounted on the top side of the housing 1, the length of the cable that connects the display screen 4 to one video connector 232 of the display circuit board 23 can be greatly shortened, and the size of the whole system can be minimized.

Further, the base 16 of the housing 1 has a certain thickness for positioning on a flat surface steadily. Further, a part of the accommodation chamber 10 extends to the inside of the base 16 for the positioning of the functional circuit board 22, enabling the internal space of the housing 1 to be fully utilized. Because the internal space of the base 16 is limited, the size of the base 16 must be greatly increased for allowing installation of a conventional single circuit board type circuit module. The invention eliminates the drawback, i.e., the invention uses the main circuit board 21, the functional circuit board 22 and the display circuit board 23 to constitute a circuit module, allowing the main circuit board 21, the functional circuit board 22 and the display circuit board 23 to be installed in the accommodation chamber 10 at different locations. Further, because display chip, radiation fins and expansion interface devices are installed in the display circuit board 23, the functional circuit board 22 simply carries expansion interface devices (such as USB connector, network connector, SATA connector and etc.), switches and indicator lights, and therefore the size of the functional circuit board 22 that is to be mounted inside the base 16 can be minimized.

In actual application of the present invention, the mainframe structure has the following advantages and features:

1. The cover 3 is mounted in the front opening 13 at the front side of the accommodation chamber 10 of the housing 1, having two handles 33 respectively mounted in the slots 32 thereof. By means of biasing the handles 33 to stop against the stop member 14, the user can detach the cover 3 from the housing 1 conveniently without any hand tools.

2. The main circuit board 21 of the circuit module 2 is vertically mounted in the accommodation chamber 10 of the housing 1 at the front side and affixed to the posts 35 of the cover 3. When the user detaches the cover 3 from the housing 1, the main circuit board 21 is detached from the circuit module 2 and the housing 1.

3. The main circuit board 21 of the circuit module 2 has its backwardly extending at least one first electrical connector 211 and at least one second electrical connector 212 respectively electrically connected to the at least one first connection port 221 of the functional circuit board 22 and the at least one second connection port 231 of the display circuit board 23. When the user operates the reversely arranged handles 33, the applied force is evenly transferred to the stop members 14 to force the main circuit board 21 and the cover 3 forwardly away from the housing 1 without tilting, avoiding sticking and simplifying the detaching procedure.

4. The cover 3 is a metal cover member comprising a plurality of radiation fins 34 located on the front side thereof and a plurality of contact portions 36 located on the back side thereof and respectively kept in contact with the chips 213 of the main circuit board 21 for quick transfer of waste heat from the chips 213 to the radiation fins 34 for dissipation into the outside open air. Thus, no extra heat sink or cooler means is necessary for dissipating waste heat from the chips 213 of the main circuit board 21, simplifying the installation procedure of the mainframe structure and saving much heat sink installation space.

5. When wishing to detach the cover 3 after the mainframe structure having been operating for a certain period of time, the user can loosen the thumbscrews 311 with one hand and then bias the handles 33 with the two hands against the stop members 14 to force the cover 3 and the main circuit board 21 forwardly away from the housing 1 without any tools or touching the hot cover 3, preventing scald injury.

In conclusion, the invention provides a mainframe structure, which comprises a housing 1 defining an accommodation chamber 10 and a front opening 13, a circuit module 2 accommodated in the accommodation chamber 10 of the housing 1, and a cover 3 detachably fastened to the housing 1 to close the front opening 13, wherein the cover 3 comprises two slots 32 symmetrically disposed near two opposite lateral sides thereof, two lugs 321 respectively backwardly extended from the two opposite lateral sides adjacent to the slots 32 and two handles 33 respectively mounted in the slots 32 and respectively pivotally connected to the lugs 321 in reversed directions, by means of biasing the two handles 33 to stop against respective stop members 14 in the housing 1, the user can detach the cover 3 from the housing 1 conveniently with the hands without any hand tools.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A mainframe structure, comprising:

a housing, said housing comprising an accommodation chamber defined therein, a front opening located on a front wall thereof in communication between said accommodation chamber and the space outside said housing, a plurality of flanges disposed around said front opening on one same plane, and a plurality of stop members respectively disposed at two opposite lateral sides in said accommodation chamber at one same elevation relative to said flanges;

a circuit module accommodated in said accommodation chamber, said circuit module comprising a main circuit board; and a cover mounted in said front opening and stopped against said flanges and said stop members, said cover comprising two slots symmetrically disposed two opposite lateral sides thereof, two lugs respectively backwardly extended from the two opposite lateral sides adjacent to said slots and two handles respectively mounted in said slots and respectively pivotally connected to said lugs and biasable to stop against said stop members and to force said cover forwardly away from said housing, each said handle comprising a base portion respectively inserted into each said slot, a connection portion backwardly extended from said base portion and pivotally connected to each said lug, a grip portion extended from one end of said base portion and an actuation portion extended from an opposite end of said base portion for stopping against each said stop member.

2. The mainframe structure as claimed in claim 1, wherein said housing comprises a front cover shell and a back cover shell; said accommodation chamber is defined in between said front cover shell and said back cover shell.

3. The mainframe structure as claimed in claim 1, wherein said housing further comprises a plurality of mounting holes disposed around said front opening on one same plane relative to said flanges; said cover comprises a plurality of mounting holes and a plurality of thumbscrews respectively inserted through the mounting through holes of said cover and fastened to the mounting holes of said housing to affix said cover to said housing.

4. The mainframe structure as claimed in claim 1, wherein said main circuit board is vertically mounted in said accommodation chamber at a front side, said main circuit board comprising at least one first electrical connector and at least one second electrical connector respectively located on a back side near bottom and top edges thereof and extending backwards; said circuit module further comprises a functional circuit board horizontally mounted in said accommodation chamber below said main circuit board in a perpendicular manner relative to said main circuit board, said functional circuit board comprising at least one first connection port located on a top wall thereof in a forwardly extending manner and respectively electrically connected to said at least one first electrical connector of said main circuit board, and a display circuit board vertically mounted in said accommodation chamber at a top side of said main circuit board, said display circuit board comprising at least one second connection port located on a front wall near a bottom side thereof and electrically connected to the at least one second electrical connector of said main circuit board.

5. The mainframe structure as claimed in claim 4, wherein said housing further comprises a plurality of through holes located on the periphery thereof; said functional circuit board of said circuit module further comprises a plurality of electrical connectors arranged at a rear side thereof and respectively attached to said through holes of said housing for the connection of external electrical devices.

6. The mainframe structure as claimed in claim 4, wherein said housing further comprises a forwardly and backwardly extended base located on a bottom side thereof for positioning on a flat surface; said accommodation chamber has a bottom side thereof extending to the inside of said base for accommodating said functional circuit board of said circuit module.

7. The mainframe structure as claimed in claim 4, wherein said display module of said circuit module comprises at least one video connector located on a top side thereof.

8. The mainframe structure as claimed in claim 1, wherein said cover further comprises a plurality of posts backwardly extended from a back side thereof for the mounting of said main circuit board; said main circuit board of said circuit module is affixed to said posts of said cover.

9. The mainframe structure as claimed in claim 8, wherein said main circuit board comprises at least one chip located on a front side thereof; said cover further comprises a plurality of radiation fins located on a front side thereof and at least one contact portion located on the back side thereof and respectively kept in contact with said at least one chip of said main circuit board for quick transfer of waste heat from said at least one chip to said radiation fins for dissipation into the outside open air.

10. The mainframe structure as claimed in claim 9, wherein said cover is made of a heat conducting material selected from a group consisting of aluminum and copper.

11. The mainframe structure as claimed in claim 1, wherein said stop members are respectively stopped against a back wall of said cover adjacent to said lugs; said two handles are respectively pivotally connected to said lugs in reversed directions.

* * * * *